(12) United States Patent
Gillum (10) Patent No.: US 8,312,119 B2
(45) Date of Patent: Nov. 13, 2012

(54) IP BLOCK ACTIVITY FEEDBACK SYSTEM

(75) Inventor: Eliot C. Gillum, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 11/069,444

(22) Filed: Mar. 1, 2005

(65) Prior Publication Data

US 2006/0200659 A1    Sep. 7, 2006

(51) Int. Cl.
*G06F 15/173* (2006.01)

(52) U.S. Cl. ...................................................... 709/223

(58) Field of Classification Search .................. 709/206, 709/223–226; 713/151
See application file for complete search history.

(56) References Cited

U.S. PATENT DOCUMENTS

| | | | |
|---|---|---|---|
| 7,356,834 B2* | 4/2008 | Smith et al. | 726/2 |
| 2003/0078035 A1* | 4/2003 | Sheha et al. | 455/414 |
| 2003/0158905 A1* | 8/2003 | Petry et al. | 709/206 |
| 2003/0229782 A1* | 12/2003 | Bible et al. | 713/155 |
| 2004/0249895 A1* | 12/2004 | Way | 709/206 |
| 2005/0268107 A1* | 12/2005 | Harris et al. | 713/182 |
| 2006/0059238 A1* | 3/2006 | Slater et al. | 709/206 |
| 2006/0075030 A1* | 4/2006 | van Riel | 709/206 |

* cited by examiner

*Primary Examiner* — Shirley Zhang
(74) *Attorney, Agent, or Firm* — Vierra Magen Marcus & DeNiro LLP (57) ABSTRACT

A system and method for providing information concerning the use of processing devices coupled to a network. Each device has an IP address the system and method: determines whether a user is authorized to receive information about the use of the processing device by reference to the IP address; verifies the authority of the user to receive information about the processing device; and provides aggregated usage information about activities based on the address of the processing device. The information provided can be email protocol command metadata.

16 Claims, 10 Drawing Sheets

1002 — `<registrar host="whois.arin.net">`

1005 — 
```
<email>Email:[\s]+([.\-\w]+@[.\-\w]+[.][\w]{2,3})</email>
<email>[(\-\w]*abuse@[.\-\w]+[.][\w]{2,3})</email>
<ipRangeEnderPattern type="range">NetRange:[\s]+[\d]{1,3}[.][\d]{1,3}[.][\d]{1,3}[.][\d]{1,3}[-][\d]{1,3}[.][\d]{1,3}[.][\d]{1,3}[.][\d]{1,3})</ipRangeEnderPattern>
```

1020 — `<ipRangeDisambiguator>[([(NET[-][\d]{1,3}[-][\d]{1,3}[-][\d]{1,3}[-][\d]{1,3}[-][\d]{1,3})])]</ipRangeDisambiguator>`

`<registrar host="whois.ripe.net">`

1025 —
```
<referral priority="1">OrgID: RIPE</referral>
<referral priority="2">NETBLK-RIPE</referral>
<referral priority="3">whois.ripe.net</referral>
<email>e-mail:[\s]+([.\-\w]+@[.\-\w]+[.][\w]{2,3})</email>
<email>[(\-\w]*abuse@[.\-\w]+[.][\w]{2,3})</email>
<ipRangeEnderPattern type="range">inetnum:[\s]+[\d]{1,3}[.][\d]{1,3}[.][\d]{1,3}[.][\d]{1,3}[-][\s][\d]{1,3}[.][\d]{1,3}[.][\d]{1,3}[.][\d]{1,3})</ipRangeEnderPattern>
```

1030 — `</registrar>`

`<registrar host="whois.apnic.net">`

1035 —
```
<referral priority="1">OrgID: APNIC</referral>
<referral priority="3">whois.apnic.net</referral>
<email>e-mail:[\s]+([.\-\w]+@[.\-\w]+[.][\w]{2,3})</email>
<email>[(\-\w]*abuse@[.\-\w]+[.][\w]{2,3})</email>
<ipRangeEnderPattern type="range">inetnum:[\s]+[\d]{1,3}[.][\d]{1,3}[.][\d]{1,3}[.][\d]{1,3}[\s][-][\s][\d]{1,3}[.][\d]{1,3}[.][\d]{1,3}[.][\d]{1,3})</ipRangeEnderPattern>
```

1040 — `<registrar host="whois.nic.ad.jp">`

`<querySuffix>/e</querySuffix>`

1045 —
```
<referral priority="1">JPNIC</referral>
<referral priority="2">whois.nic.ad.jp</referral>
<email>[(\-\w]+@[.\-\w]+[.][\w]{2,3})</email>
<email>[(\-\w]*abuse@[.\-\w]+[.][\w]{2,3})</email>
```

1050 — `</registrar>`

`<registrar host="whois.nic.or.kr">`

1055 —
```
<referral priority="1">whois.nic.or.kr</referral>
<email>E-Mail[\s]+:[\s]*([.\-\w]+@[.\-\w]+[.][\w]{2,3})</email>
<email>[(\-\w]*abuse@[.\-\w]+[.][\w]{2,3})</email>
<ipRangeEnderPattern type="range">IPv4 Address[\s]*:[\s]+[\d]{1,3}[.][\d]{1,3}[.][\d]{1,3}[.][\d]{1,3}[\s]*[-][\s]*[\d]{1,3}[.][\d]{1,3}[.][\d]{1,3}[.][\d]{1,3})</ipRangeEnderPattern>
</registrar>
```

IP BLOCK ACTIVITY FEEDBACK SYSTEM

BACKGROUND OF THE INVENTION

1. Field of the Invention

The present invention is directed to providing information on the activities of network devices having unique addresses. In particular, the invention is directed to providing a mechanism for owners of IPs or IP blocks to obtain information such email usage statistics on the activities of computers at that IP or within their IP blocks.

2. Description of the Related Art

Generally, large enterprises such as corporations, universities, and (Internet Service Providers) ISPs, own large quantities of Internet protocol addresses. Two versions of IP exist in use today. Nearly all networks use IP version 4 (IPv4), but an increasing number of educational and research networks have adopted the next generation IP version 6 (IPv6). For owners of large IP blocks, maintaining information on the activities of computers within those blocks is difficult. For example, ISPs may sell or lease IPs or blocks to individuals or organizations, and provide additional services to users of their IPs. However, there is no truly effective means for them to audit user activities other than receiving reports from outside agencies on the use of those IPs.

The most common use of the Internet is communication via electronic mail. One of the most common forms of email is provided by Email Service Providers (ESPs) such as Yahoo! Mail, Microsoft Hotmail, Google GMail, and other free Web-based email services. Each of these providers aggregates a large number of messages which are inbound to the providers, many of which are spam or unsolicited bulk-email messages. spam is thus a major concern for ESPs and each implements some form of spam filtering and protection for users. Large scale ESPs can stop a limited amount of spam using various spam detection mechanisms, including comparing the sending IP address to a list of known spammer addresses or confirming the validity of the sending IP address with a Domain Name Service (DNS) server. Though typical anti-spam applications remove a portion of incoming spam from user accounts, they do not prevent all UBE from being delivered to user email accounts. For owners of large IP blocks, spam email can be as much of a problem as it is for ESPs because of the increased network bandwidth consumption, customer complaints when blacklisted, and a bad corporate reputation.

Originators of spam try to harness the resources of as many machines as they can to send their messages. Generally, spammers hide the origin of spam by utilizing unsuspecting servers on the Internet, known as zombies. Spammers can flood large mail processing systems to the point where insufficient bandwidth is available to process legitimate email. ISPs and other owners of large IP blocks cannot monitor every machine within the IP block, and the manner in which various spyware, and zombie email re-mailers work—by inserting themselves on machines without knowledge of the ISP or the machine's owner—make them difficult to find.

When a message is received by an email service provider (ESP), information relating to the Internet protocol (IP) address of the sender of the message is obtained by the receiving email system. With these ESPs receiving large volumes of email, in some cases up to 3,000,000 messages a day, a large quantity of data on which servers IP addresses information is coming from.

Providing a system which would give IP block owners information about the machines within their address block from the perspective of a system or systems outside that block which interacts with the block would be useful to both the block owner and the end user.

SUMMARY OF THE INVENTION

The invention, roughly described, comprises a method for providing information concerning the use of processing devices coupled to a network. Generally, each device has an IP address and the method comprises the steps of: determining whether a user is authorized to receive information about the use of the processing device by reference to the IP address; verifying the authority of the user to receive information about the processing device; and providing aggregated usage information about activities based on the address of the processing device. The information provided can be email protocol command metadata.

In a further embodiment, the invention is an automated method which determines a relationship between an Internet Protocol address and a user. In this embodiment, the method includes determining verifiable email addresses associated with one or more IP addresses by reference to registrar maintained records regarding the IP addresses; and verifying user access to the verifiable email address. The automated method may further include the step of providing aggregated usage information about activities of one or more processing devices having said one or more IP addresses.

In yet another embodiment, the invention is an enterprise email system providing email services to a plurality of users having accounts with the system. The enterprise email system also provides information services about computers sending messages to the system. The enterprise email system includes at least one inbound MTA server receiving email protocol commands. In addition, at least one mail connection server providing users having accounts with the system access to their email messages is included. Finally, an information service processing server is provided which includes a reporting engine providing protocol command usage information to automatically authorized users about computers sending messages to the system.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 10 is an XML listing of the WHOIS parsing structure and examples for parsing a WHOIS result with regular expressions utilized by the method shown in FIG. 9.

DETAILED DESCRIPTION

The invention provides a system and method which enables individual IP owners, and IP block holders, access to information on the activities of their system from the point of view of an enterprise interacting, with the IP or IP block. IP block holders, such as corporate email traffic generators, ISPs and universities, can then use this information to interact with uses within the block to correct the problem. This provides a unique opportunity for both the enterprise providing the information and the IP block holder to increase the efficiencies of both their systems.

In the example provided herein, the enterprise interacting with the IP or IP Block is an enterprise email service provider (ESP), and the aggregate information on the use of the IP or IP block can be utilized by the owner of the IPs to reduce spam or other nefarious activity. In accordance with the present invention, the system and method of the present invention analyze traffic patterns and DNS/WHOIS data to determine whether a user should be allowed access to aggregate or qualitative information provided about a particular set of IPs. Access to such information can be provided via a Web interface or an emailed report. At regular or user-determined intervals, the IP block administrator can be provided with a real time data snapshot of traffic being sent from the IP ranges forwarded to be authorized.

Where the invention is implemented between an ISP block holder and an ESP information service provider, the present invention allows the ISP to use their relationship with the entities within their control to prevent spam or other nefarious activities. This benefits the ISP, since the ISP receives reduced bandwidth costs and is able to help their customers be safe and recover from infections which compromise the use of their computers. Users benefit from improved system performance, increased security, and decreased attacks on their system. The IP block owner and ESP benefit because their systems are not encumbered by such activity. In addition, the ISP benefits from the protection of the network's reputation as being a source of spam. Because of the enormous customer base and mail volume which an ESP can provide, the ESPs are in a position to provide a vertical subset of data collected by programs such as spam filters running on the ESP. In an alternative embodiment, some such information could be provided by network analysis tools.

In the present invention, automation allows the information to be provided at a very low cost. In one embodiment, the ESP provides only statistical information in the form of comprises protocol command metadata about the IP block to authorized users or recipients. Even so, the information provided in statistical fashion is not useful to unauthorized users, should the information accidentally be provided to an un-authorized user. Periodically, users can be forced to re-authorized themselves (or others) to ensure unauthorized users do not have access to the information service.

Figure 1:
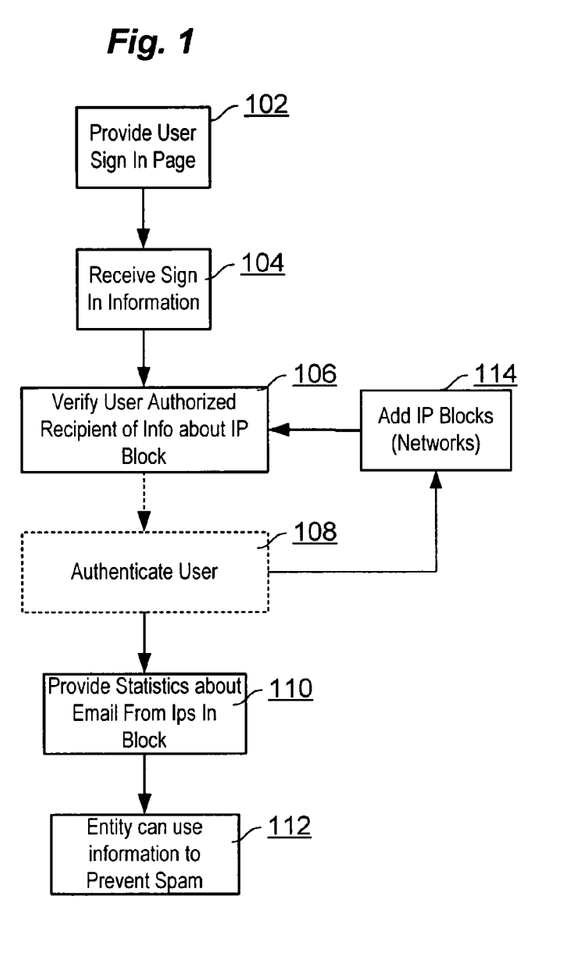
FIG. 1 is an overview flowchart of a method of the present invention.

FIG. 1 is a flowchart illustrating the general method of the present invention. In the example described herein, the information service is provided by an ESP, or a secondary information service with access to the data provided by an ESP. Both such entities will be referred to herein as the administrator or the information service. It will be noted that the information service need not be limited to data coming from ESPs or even to email data, but could be provided from any large network information gathering source.

In order to access information about a particular IP block, users must first opt into the information service system. At step 102, a user is provided with a sign-in interface such as a Web page or other mechanism in order to avail themselves of the services provided by the information service. In step 104, sign-in information from the user is received from the user sign-in interface provided at step 102. At step 106, the sign-in information received in step 104 is used to verify that the user seeking information about an IP or IP Block is authorized to receive information about that block. In one aspect, this is accomplished by verifying that such user has access to an email addresses which can be independently verified to be associated with the owner of the IP or IP block. As described below, the user is determined to be an authorized user by proving to the system that he has access to email sent to such address. The authorization and reporting processes may be automatically performed so that no additional significant performance load is incurred by the information service provider.

Once the user has been verified to be authorized to receive information about the IP block, the user may be authenticated at step 108, such as, for example, by requesting a user login and password. It should be recognized at steps 106 and 108, may be temporally and logically separated such that step 102-106 need only be performed once, while steps 108-112 can be performed repeatedly. In addition, step 108, may be implicit in the sign-in process and during at least the first retrieval of IP block information, may be skipped or may be performed automatically by recording the user's identity with a cookie set in a Web-browser.

Once the user has authenticated, statistics about email from IP addresses within the user's identified IP block are provided to the user via a Web-browser based interface or email report at step 110 as described below. At step 112, the user or entity can use the information provided about the IP block in step 110 to prevent spam or otherwise interact with the entities under its control.

In a further aspect of the present invention, once users have verified they are authorized to have access to an IP or IP block, and are authenticated users, they can be provided with the opportunity to add additional IPs or blocks at step 114. At step 114, the user will provide additional IPs which will then be verified at step 106, all of which will be displayed to the user at step 110.

Figure 2:
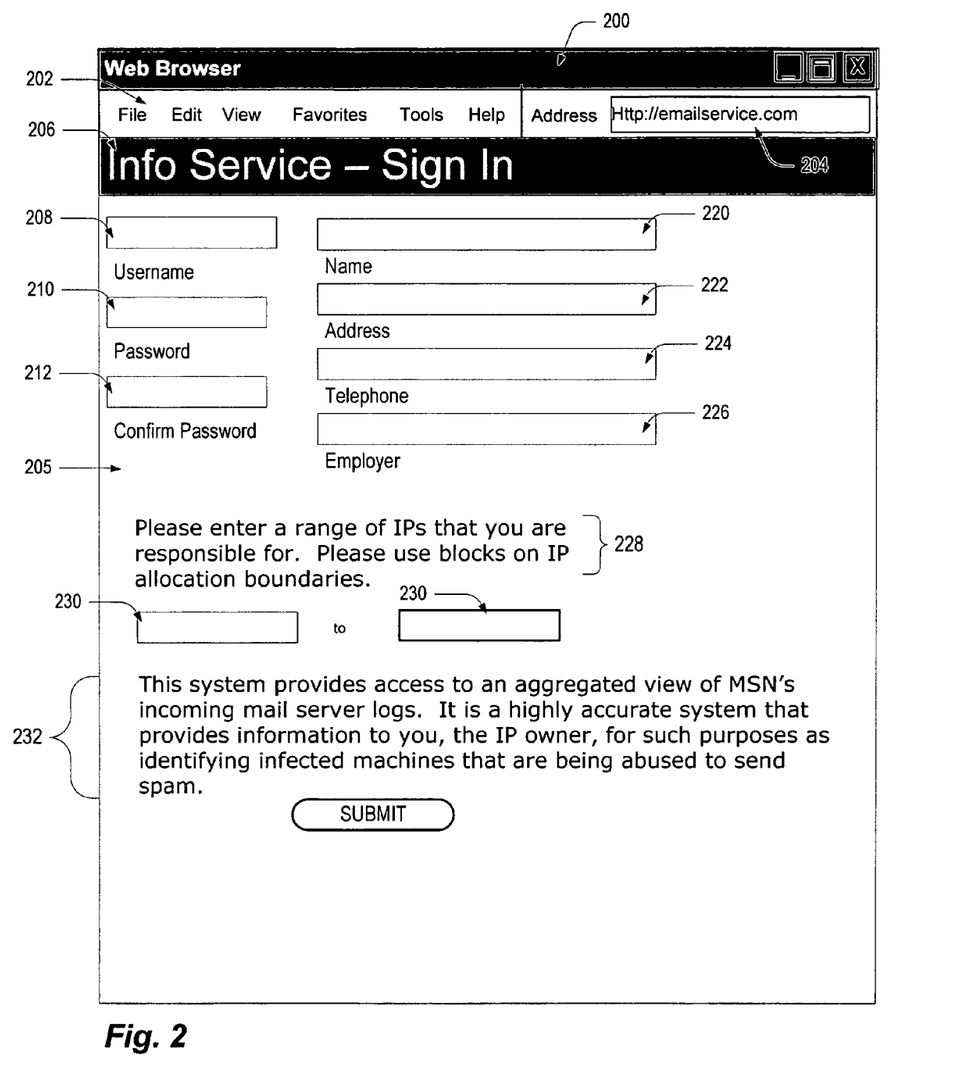
FIG. 2 is a depiction of a sign-in page of a user interface provided by a system and method in accordance with the present invention.

An exemplary user interface to complete a sign-in process at step 102 is shown in FIG. 2. As shown therein, a sign-in page provided by the method and system of the present invention can be provided in a Web page 200 in a standard Internet browser. While the present example illustrates the interface 205 in a Web-browser, alternative interfaces can be utilized, such as an email form or dedicated user interface application. In FIG. 2, the browser provides a menu bar 202 having standard browser functionality including an address field 204 allowing a user to type or otherwise select a specific address via a uniform resource locator (URL) for the information service. The interface 205 may include a title indication 206 with the name of the information service "info service" and an indication that this is the sign-in page for the service. Data collected at step 104 and provided by the user is input to a series of form fields which include a user name 208, a password 210, a requirement that the user confirm the password in field 212, as well as the user's name 220, address 222, telephone number 224 and employer 226. The foregoing information requested is exemplary and more or less information can be requested by the system. A message 228 requests that the user enter a range of IPs in form fields 230. Fields 230 take, as input, Classless Internet Domain Routing (CIDR) information or a range of IPs. Another message 232 is provided that indicates to the user that the data user is signing up for is an aggregated view of the ESPs incoming mail server logs, thereby encouraging the user to seek access to the system.

Once the user enters the information in the requisite fields in FIG. 2, and selects the submit button 250, the process to verify that the user is authorized for the information for the IP block at step 106 occurs.

Figure 3:
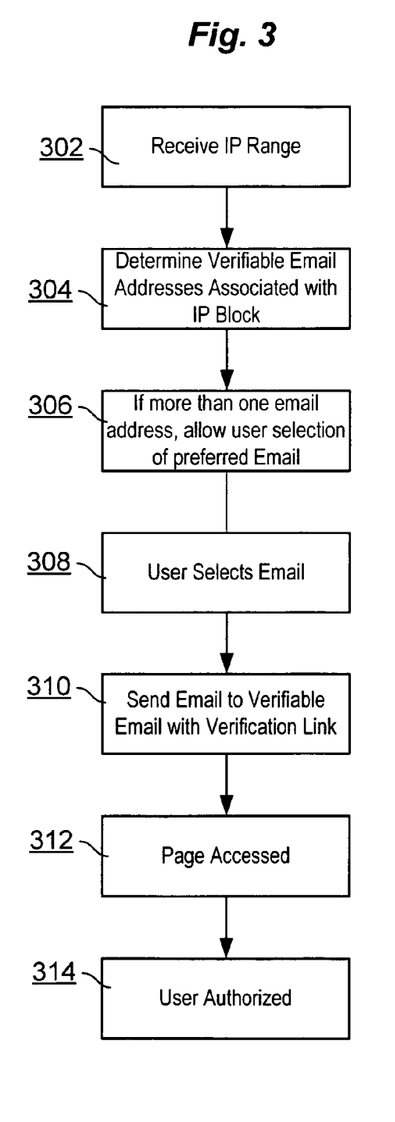
FIG. 3 is a depiction of another aspect of the sign-in user interface in accordance with the method of the present invention.

The process for determining the email addresses associated with the IP block at step 106 is further detailed in FIG. 3. At step 302, the range of IPs or IP blocks submitted in the information gathering step 104 (from the sign in page of FIG. 2) is received. At step 304, the method determines verifiable email addresses associated with the IP block. The method 304 for determining the verifiable email addresses associated with the IP block is discussed below with respect to FIGS. 8-10.

Figure 4:
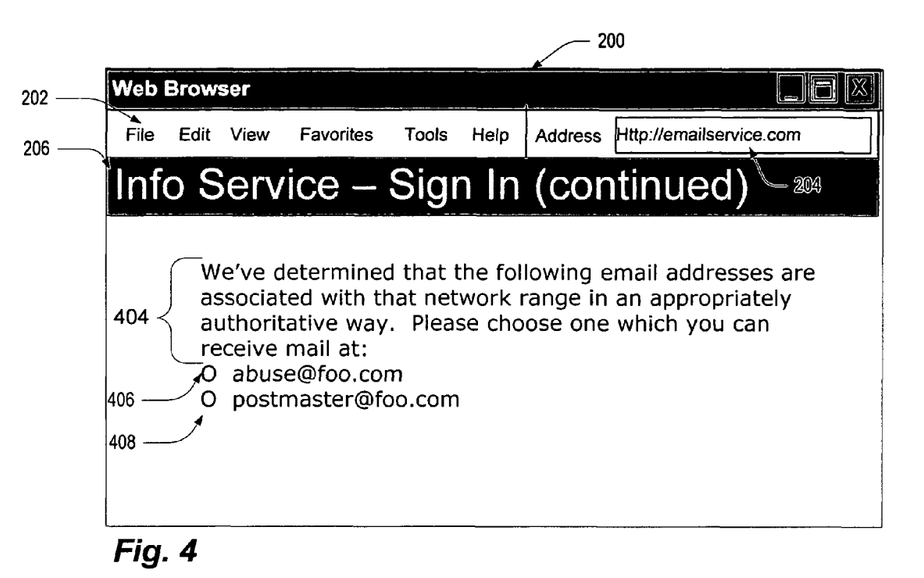
FIG. 4 is a flowchart representing a method for verifying the authority of a user allowed to receive information about an IP block in accordance with the present invention.

At step 306, if more than one email address is provided, the user is allowed selection of the preferred email address as shown in FIG. 4. The result of this determination will be displayed along with a notice 404 indicating that the system has determined multiple email addresses are associated with the network range in an appropriately authoritative way. In the example shown in FIG. 4, the notice 404 specifies that the email address abuse@foo.com 406 and postmaster@foo.com 408 are both associated with the IP block that the user has entered information for at step 104.

In order to prove the user is authorized to receive information about the IP block, the user is required to have access to email at one of the verifiable email addresses retrieved at step 304. As indicated below, the email addresses are those which have been associated with the IP block by Internet Registrars. The interface of FIG. 4 shows two radio buttons 306 or 308 which allow the user to make a selection by clicking on one of the two buttons to complete step 408. It should be understood that other selection mechanisms for the IP or range may be provided by the interface.

Figure 5:
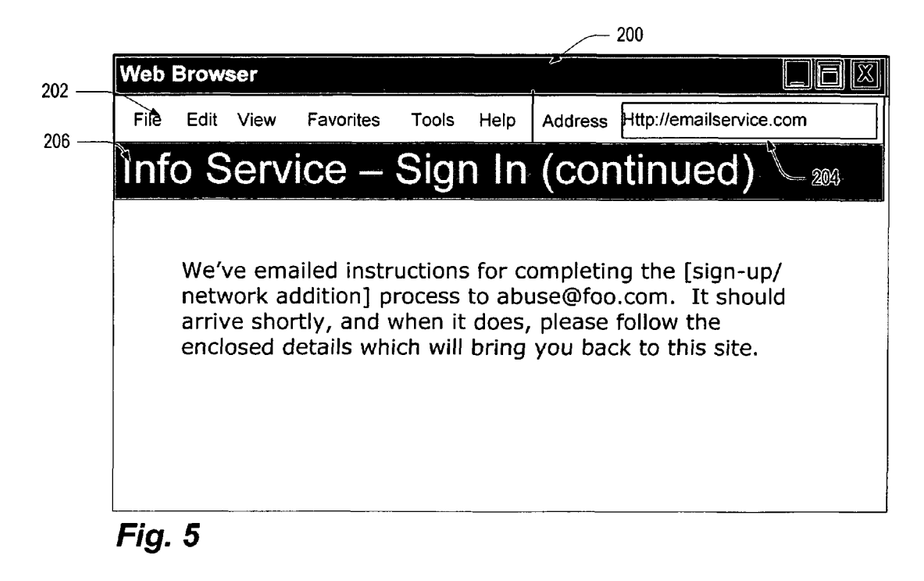
FIG. 5 is a depiction of another aspect of a sign-in interface provided by a system and method in accordance with the present invention.

Once step 308 is completed, at step 310, an email message is sent to the verifiable email address selected by the user. Concurrent with the sending of this email, an information screen such as that shown in FIG. 5 is displayed on a Web browser interface. The message 502 displayed thereon indicates that the system has emailed instructions for completing the sign-up process to abuse@foo.com.

Figure 6:
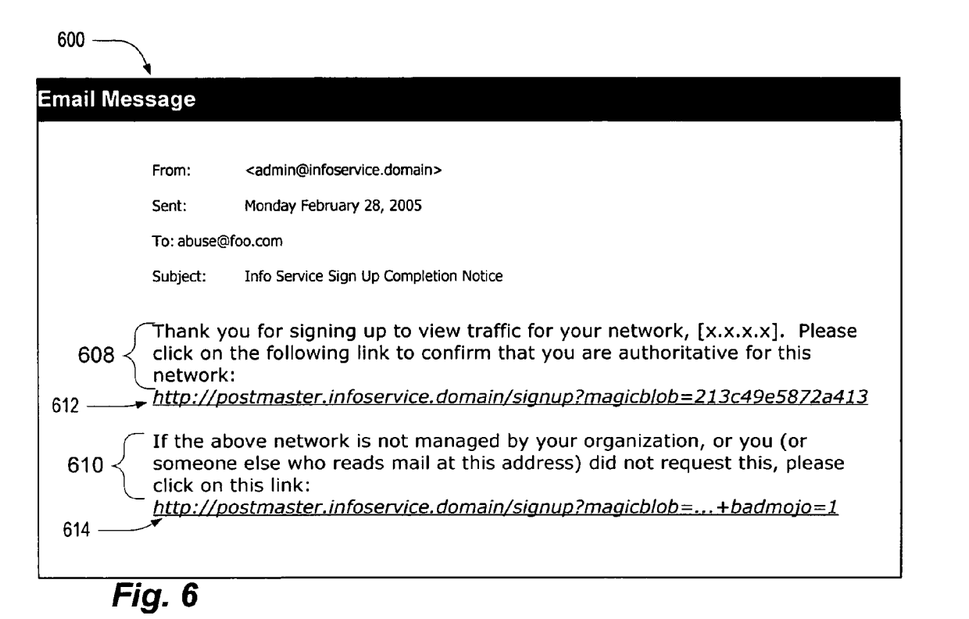
FIG. 6 is a depiction of an email message issued during the verification process of the system and method of the present invention.

An example of a message sent at step 310 is shown in FIG. 6. As shown therein, the message will be sent from, for example, the administrator@infoservice.com to the user-selected abuse@foo.com address. The email 600 will contain at least two messages: a message 608 and link 610 to allow the user to select a link to verify that he has accessed the email address, and a message 612 and link 614 allowing a user who has incorrectly received the email to opt out and notify the info service provider that the message was received by an address for which information should not be provided. In another embodiment, the email sent may also include a message from the user requesting access, to facilitate a statement of identification and intent to other users who may also receive mail at that address. To prevent this mechanism from itself becoming a source of spam, the message should be sufficiently limited, most practically in terms of size.

Figure 7:
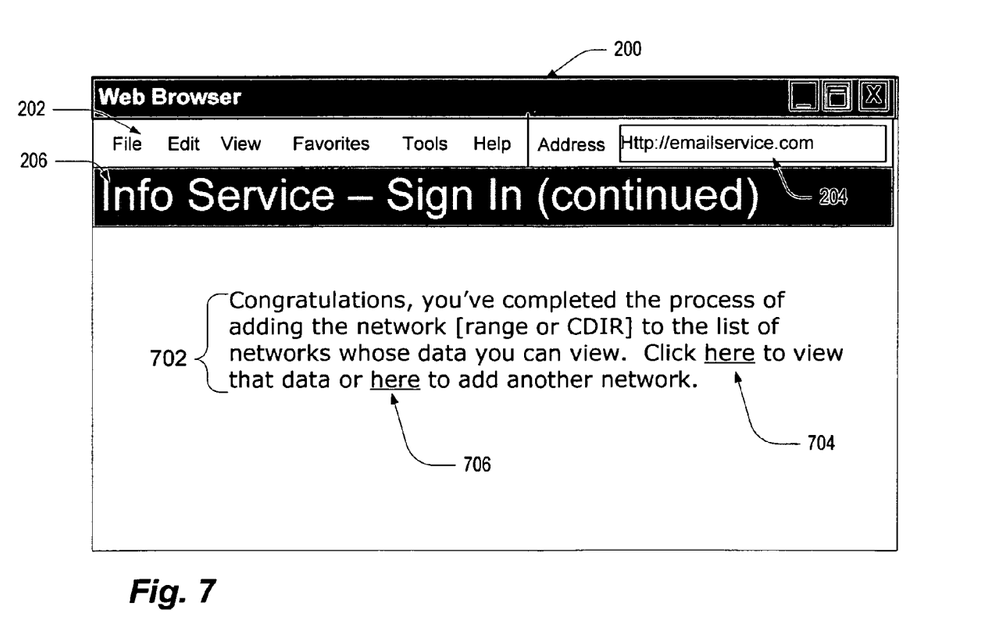
FIG. 7 is a depiction of another aspect of a Web-based interface for determining whether a user is allowed to receive information about an IP block in accordance with the present invention.

At step 312, once the verified link 610 in the message of FIG. 6 is selected, step 312 is completed and the user is authorized at step 314. Once step 314 is complete, a message 702 such as that shown in FIG. 7 can be displayed. This indicates to the user that the user has completed the process of adding a network to their domain, and may provide a link 706 to add an additional domain. An optional link 704 to allow the user to go directly to the data display page can be provided.

Figure 8:
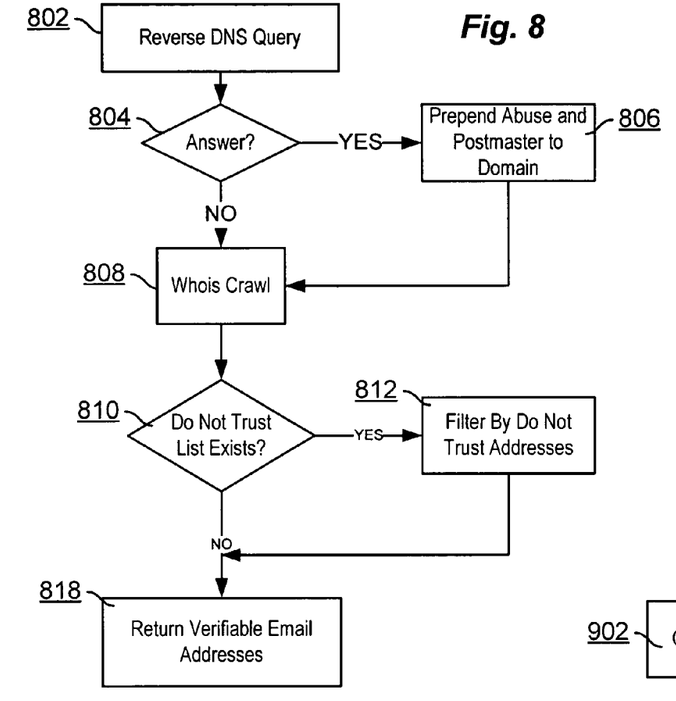
FIG. 8 is a flowchart illustrating a method for determining verifiable email addresses associated with an IP block in accordance with the present invention.

FIG. 8 illustrates the process for determining a verifiable email address associated with an IP block, step 304 as shown in FIG. 3. The goal of the algorithm is to determine both that the block belongs to one entity, and to find the largest possible set of email addresses that could be considered responsible for the range. Two mechanisms are employed to accomplish this: DNS and WHOIS. Because of the complexities of WHOIS, a system intended to be human readable, a DNS-based answer for the algorithm is preferable. However, a large portion of the Internet's active IP space does not have a reverse DNS record. Thus, the algorithm uses WHOIS data as well. The algorithm shown in FIG. 8 thus combines the answers obtained from both processes to allow as many verifiable addresses to be obtained as possible.

At step 802, a reverse DNS inquiry is made using one or more sample IPs in the address range. A sample is utilized since the range of IPs input at step 104 may be rather large. For example, a "/14" address range contains 256,000 IPs. A system doing a reverse DNS inquiry on even 1% of these addresses would require significant processing time, and the time required to display the message indicating the verifiable addresses would be significant. Hence, in one embodiment, the sample set of IPs applied could be the first and last IP in the range, as well as an appropriate sampling of IPs within the range. A set of timeouts can be provided or, optionally, if any of a number of host name domains do not match, the status of the algorithm will not contribute any trusted addresses. If an answer is received at step 804, a top-level domain (TLD) name for the address block will be retrieved. Once retrieved, the method at step 806 prepends the "abuse@" and "postmaster@" email names to the named TLD. This approach encourages standard addresses and keeps this portion of the algorithm relatively simple. In addition, while it is possible for someone to alter a pointer (PTR) record to point to a different domain, it is not possible to breach the security of the system by doing so since one can only give another domain permission to view their data, but not vice versa.

In one embodiment, an algorithm to determine the named TLD from the reverse DNS result is utilized which evaluates the domain string retrieved until a top level domain is returned. A reverse DNS query may provide a sub-domain result such as mx.mail.so1.foo.com or mx.mail.so1.foo.co.uk. The algorithm proceeds by examining the result from right to left, examining, for each dot within the returned result, whether the expression to the right is a top level domain, (e.g. "corn" or "co.uk"). When a TLD found, the algorithm retrieves the domain from the name expression immediately to the left of the TLD found.

Once step 806 is completed, and whether or not the reverse DNS provides any data at step 804, a WHOIS record algorithm retrieves verifiable addresses at step 808. The WHOIS algorithm 808 a program that crawls the WHOIS result records according to determine which local registrar has responsibility for an IP or IP block, queries that registrar for a record of the IP, and then parses that record for usable, verifiable emails.

As is generally understood, a number of Regional Internet Registries (RIRs) are responsible, within their assigned regions, for allocating Internet globally unique IP addresses (IPv4 and IPv6). IANA, as the organization in charge of all IP addresses, assigns the largest blocks of addresses to RIRs that are responsible for further allocation activities.

Each RIR manages IP addresses and other Internet number resources (such as autonomous system numbers) for a particular region. The four regional registries are: Asia Pacific Network Information Centre (APNIC) which Covers the Asia/Pacific region, American Registry for Internet Numbers (ARIN) which manages North America, part of the Caribbean, and sub-equatorial Africa; Latin American and Caribbean Internet Addresses Registry (LACNIC) which is responsible for Latin America and part of the Caribbean; and Reseaux IP Européens Network Coordination Center (RIPE NCC) which takes care of Europe, the Middle East, Central Asia, and Africa north of the equator. Each registry may assign address blocks to Internet service providers (ISPs) directly, or further delegate them to national Internet registries (NIRS) or smaller local Internet registries (LIRs). An example of a national Internet registry is Japan Network Information Center (JPNIC). The WHOIS algorithm determines which, if any, regional, national or local registry is responsible for managing the IP or IP Block for which information is requested, and parses any of a number of individualized records retrieved from such registry.

Figure 9:
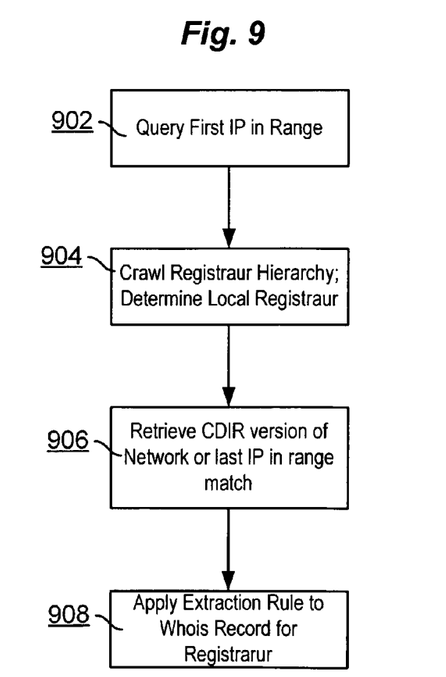
FIG. 9 is a flowchart illustrating a method for determining verifiable email addresses from a WHOIS query response in accordance with the method of the present invention.

FIG. 9 shows the functional steps of the WHOIS algorithm 808. As shown in FIG. 9, the first IP in the IP block is queried at step 902. Once the desired result for this IP is retrieved, the method will crawl the registrar hierarchy to determine the local registrar has "ownership" of that IP at step 904. Once this procedure at step 904 has produced the registrar needed, the registrar is queried for the WHOIS record for a given IP, and the record is scanned for the CDIR version of the network or the last IP in the range to establish the top-level domain for the network.

Once step 906 is complete, at step 908, an extraction process is used to determine verifiable emails from the record. The process applies rules in the form of a series of regular expressions characterizing all possible way email addresses may appear in the record to the record to extract individual email addresses there from. These addresses are combined with those of the DNS query prepending step 806 as the output of step 808.

Once the addresses are retrieved by the extraction step 808, the system may optionally determine whether a "do not trust" list exists. The "do not trust" list may be provided to allow the system's administrators to specify individual addresses which should not have access to the data coming from the ESP. The use of such a list can be advantageous since registrars themselves edit the allocation records in the WHOIS data source, and can insert their own addresses into the records (for auditing purposes, e.g. into the "changed-by" field). Fundamentally, however, such a feature is a "safety valve" to allow manual override of the authorization system. If a "do not trust" list exists at step 812, the addresses specified in the "do not trust" list will be filtered out. If a "do not trust" list exists, the verifiable email addresses retrieved from steps 806 and 808 will be returned to step 404 to be included in the Web-page interface forwarded to the user during the sign-up process.

FIG. 10 illustrates a portion of the WHOIS parsing algorithm with specific examples (in XML expression) of the regular expressions utilized crawl the WHOIS record of steps 904, 906 and 908. It should be recognized that a number of alternative embodiments of methods suitable for extracting information from a WHOIS record which may be utilized for implementing the present invention. The particular examples of regular expressions for crawling the WHOIS records reflected in FIG. 10 are merely a sample of a number of possibilities of results that will be encountered by results received from various registrars. Numerous additional expressions in addition to those shown in FIG. 10 are utilized to accommodate all the potential renderings of a WHOIS record by different RIRs, LIRS and NIRs.

Line 1002 of FIG. 10 begins a series 1005 of regular expressions used to parse the results from registrar host "whois.arin.net". Sequence 1005 includes two email expressions and two IP range expressions. Because the results which one might expect from an ARIN.NET WHOIS query follow a relatively consistent form, the sequence 1005 looks for email addresses following any appearance of the term "Email" (capitalized) or a specification of the name address of "abuse@" in the WHOIS record. The first "Email" expression will search for the term "Email" and return results of, for example, a listing of "TechEmail", "OrgAbuseEmail" and "OrgTechEmail". The next expression determines the network range associated with the IP by searching for and parsing the values associated with the "NetRange" specification in the record, if present. Finally, the "DisAmbiguator" expression searches for the NET handle to identify and distinguish cases where the registrar returns not a record, but a reference to a plurality of records which all contain the requested IP.

The next series of expressions illustrates the user of referral priorities in the system. At line 1020, a series of expression 1025 for the registrar host WHOIS.ripe.net is shown. The first three expressions "referral priority" indicate that the following series of expressions are to be used to identify the "whois-.ripe.net" server to be the record holding server. For example, where an the initial query to a WHOIS record on a different RIR (such as Arin.net in series 1005) returns an OrgID of RIPE, but returns a value also containing "whois.apnic.net". Hence, in the referring record, a conflict appears between the OrgID and whois.apnic.net expression, the OrgID will take precedence because it has a high priority (1) than the other (3). The next expressions in the sequence search "email" as in the example set forth in series 1005 above, except that the first email expression looks for a lowercase "e" in the RIPE.net WHOIS record. Finally, the IP range covered by the record is determined by reference to the inetnum expression in the Ripe.net record.

Another example for apnic.net 1030 includes the series of regular expressions 1035. APNIC can have two different referral priorities, where a previous record indicates that the "OrgID" as APNIC or the record refers to "whois.apnic.net." The email string searched for is "e-mail:" and an email using the term "abuse" and the IP range is searched for "inetnums". Another example is the Japanese NIR shown at line 1040. In this series of expressions 1045, the query suffix /e is required to return English name examples. Also in this series, email strings are searched merely for the "@" signal and "abuse@" signals.

Returning to FIG. 1, once the user has verified that the user is authorized to receive email at a verifiable address for a given IP block, authenticating themselves the user can view statistical data at step 110. Steps 102 and 104 need only be performed once.

Figure 11:
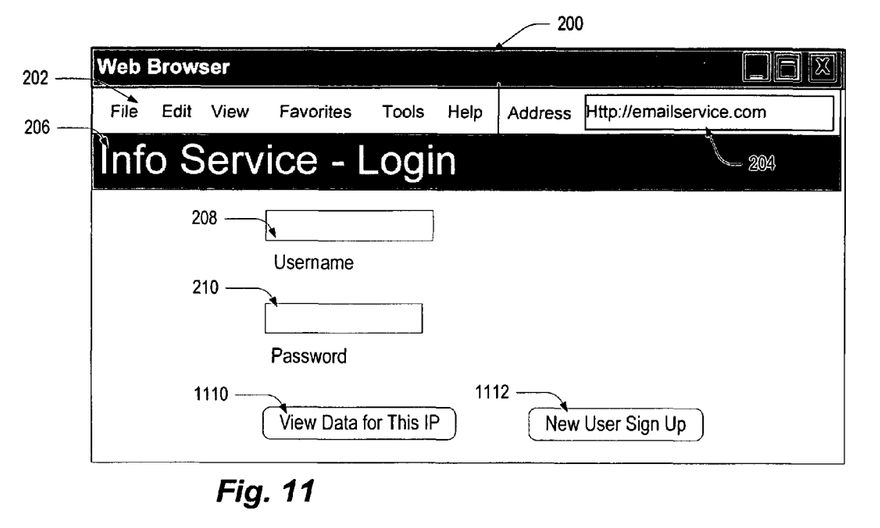
FIG. 11 is a depiction of an exemplary Web-based login screen provided by the method and system of the present invention.

If a user needs to authenticate with the system, step 108 is performed. In one embodiment, authentication can be accessed through the use of a Web interface 1100 as shown in FIG. 11. In FIG. 11, the user can enter his user name 208 and password 211, and selects the sign in button 1114 to begin an authentication process. If the user has proven his identity by providing the correct username and password, the user can be directed to a start page allowing the user to select one of a number of additional functions. Alternatively, or in addition to the sign-in button, the interface in FIG. 11 can provide a "view data for this IP" button 1110. Selection of button 1110 directs the user to an interface (similar to that set forth below in FIG. 13) which provides access to data associated with the user machine's IP block. This designed for end-users to ensure their own machine is not a spam zombie. This allows an ISP to offer a source of third-party, impartial data to a user if it seeks to inform the user that there is a problem with their device. Also, with access to the system placed in the hands of users, it encourages users to keep their computers healthy. If the user is a new user who has reached, this page, then a new user signup button 1112 is provided.

Figure 12:
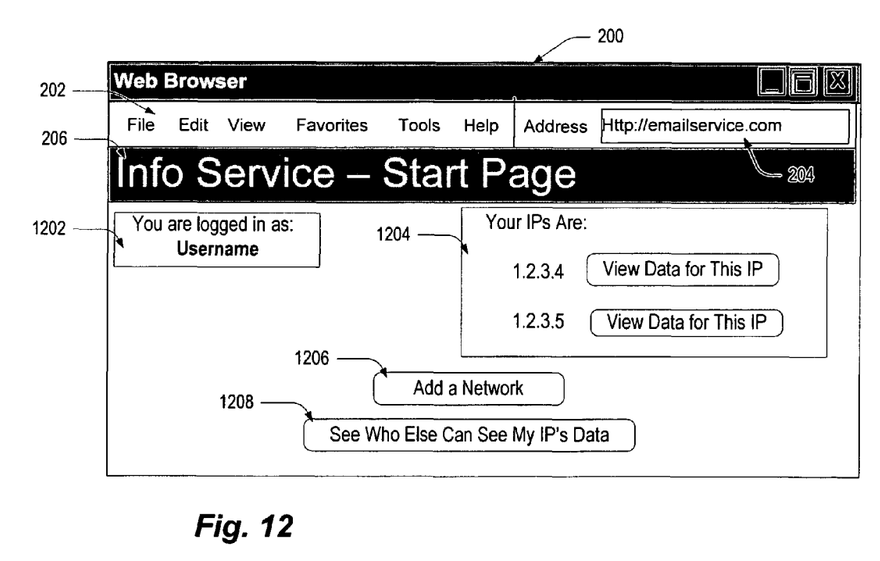
FIG. 12 is a depiction of an exemplary information service start page provided by the system and method of the present invention.

Once the user accesses the system and completes the authentication step at 108, a new-user startup page as shown in FIG. 12 can be provided. Start up page 1200 will provide the user with the information such as a user greeting 1202, available IPs or IP Blocks and selection buttons to view data for the IPs or IP blocks 1204, an "add a network" button 1206 and a "see who else can see my IP's data" button. Selection of the "Add a network" Button 1206 begins the authorization process at step 106 in FIG. 1 for another IP or IP block, allowing the user to add one or more additional networks by repeating steps 106-110. Selection of the "see who else can see my IPs Data" provides the user with a report of other users who have been authorized to access the user's IP or IP block data. This information can be provided by showing the user a list of validated addresses that have been used to authorize users to access information for an IP or IP block, and/or a list of usernames associated with the validated emails or email accounts. This is a key feature, as it allows cross checking of the authorization system to occur by the actual owners of the data, and the output displayed may comprise a table with one row for each network that both the current user and another user can see, along with a "re-authentication" link forcing the user displayed to go though the authentication process again for that network.

Figure 13:
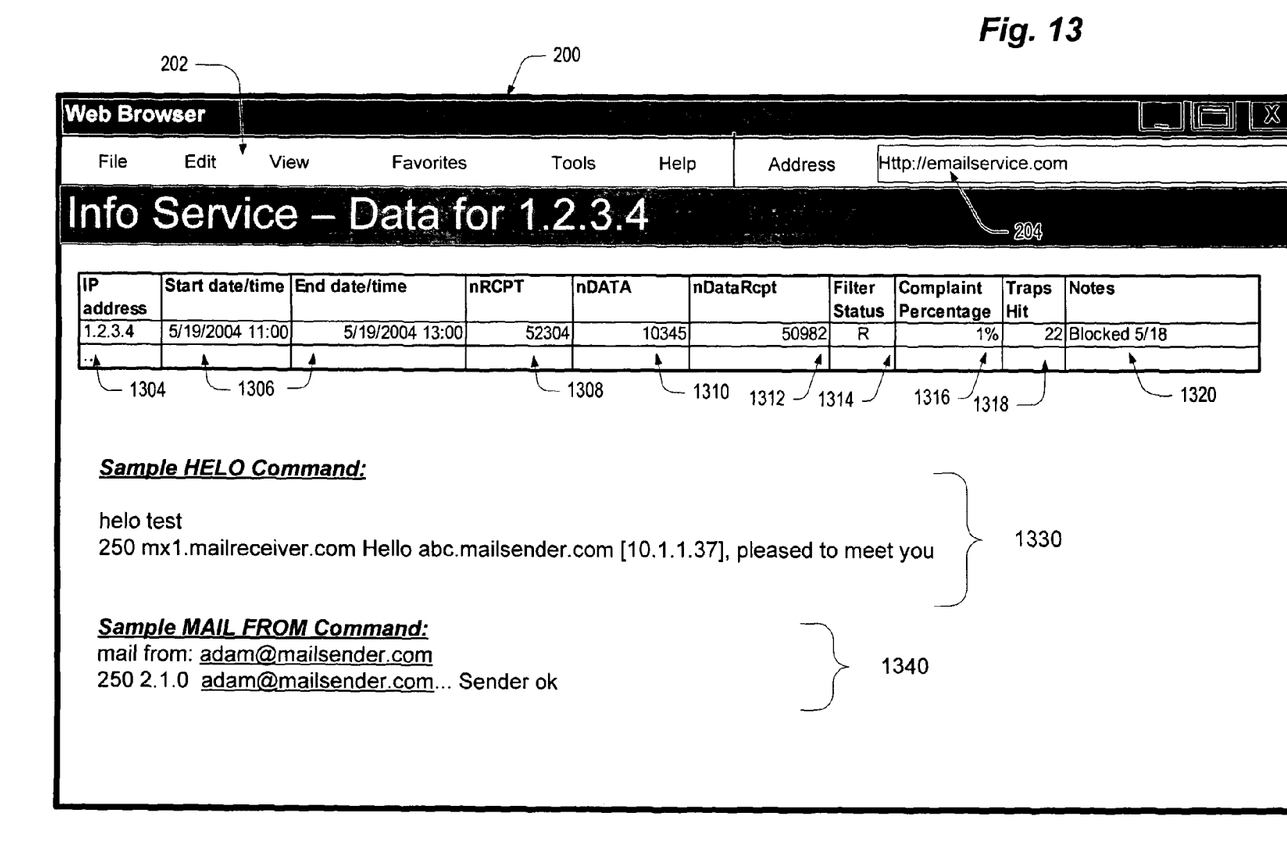
FIG. 13 is an exemplary Web-based IP block report provided by the system and method of the present invention.

When the user selects the display information for the IP or IP block, a report page 1300 such as that shown in FIG. 13 may be displayed. The display page 1300 provides information for one or more IPs or IP Blocks in a table form 1302. An exemplary table 1302 of information can include a row of information for each IP in the block in the table 1302. All IPs may be specified individually or in groups. Depending on the source of the information service, data provided to the user may be purely statistical or may include more qualitative information.

The statistical information by itself provides an indication of the use of the IP. This is best understood by reference to an exemplary exchange between a sending and receiving computer, which might occur as follows:

R: 220 www.example.com ESMTP Postfix
S: HELO mydomain.com
R: 250 Hello mydomain.com
S: MAIL FROM: sender@mydomain.com
R: 250 Ok
S: RCPT TO: friend@example.com
R: 250 Ok
S: DATA
R: 354 End data with <CR><LF>.<CR><LF>
S: Subject: test message
S: From: sender@mydomain.com
S: To: friend@example.com
S:
S: Hello,
S: This is a test.
S: Goodbye.
S: .
R: 250 Ok: queued as 12345
S: quit
R: 221 Bye Statistical information for a given IP which might be available from an info service provider such as an ESP includes, for a given IP address 1304 and time range 1306, the number of "RCPT TO" to commands 1306 received from that IP, the number 1310 of DATA commands associated with the RCPT TO commands, and the number 1312 of recipients associated with the DATA commands at 1310. Qualitative data which may be provided from an ESP may include data from spam filters and trap accounts used to improve the accuracy of the spam filters. In this case, information provided to the user may include: a "filter status" 1314—a colored (Red, Yellow, Green) indication of the number of messages transferred from the IP which are labeled as spam by the ESP's filters; a complaint percentage 1316—reflecting an actual number of complaints about messages coming from the IP by ESP users; the number of trap accounts 1316 run by the local ESP which have been hit by the IP, and any miscellaneous notes 1318 such as whether the number of complaints or spam filter hits have cause the ESP to block messages coming from the IP, whether the ESP has detected the IP as an open proxy, or other metadata. The filter status 1312 can indicate whether spam filter is running on the ESP and determine that a given IP is sending some level of spam. This can be an indication of blacklist spam filters, or other spam filters, run by the ESP. In one embodiment, a color indicator such as red, yellow and green is used. Red can indicate that the number of spam messages coming from a particular IP is over 90%, yellow between 90% and 10%, and green under 10%. In a further embodiment, data need not be provided on all IPs—specifically those IPs that send very little mail don't account for a significant fraction of the spam problem.

If an IP is being used for name-space mining, the number of RCPT TO commands will be much greater than the actual DATA recipients. The traps hit indicated in 1316 can be an the number of message sent to spam traps by the IP.

Also shown in FIG. 13 is a sample HELO command 1330 and a sample MAIL FROM command 1340. These two sample commands can be randomly selected from a number of emails coming from a particular IP, and if the commands indicate a spoof of the originating domain, provide a strong indication that the device using the IP is being misused. It should be recognized that other information about the IP could be provided in the table 1302 as well, and that alternative means for providing the information on the IP can be utilized in accordance with the present invention. For example, the reporting function may be implemented by providing a periodic email report mailed to the verified email address, or may be provided in a parseable format such as XML allowing the user to incorporate the information into data reports of the user's choosing. It should be recognized that just as a user may be provided with the option to select different IPs or IP blocks to view, different date ranges or time periods may be selectable. Other filters, such as limiting the report to those IPs having a "red" filter status or which were blocked, can be built into the interface as well. It should be noted that if an end user is being allowed to view data about the IP requesting the information (the "view data about this IP" link 1110 described above), the data in the table could be a daily history for the individual IP, rather than a single day-view with a date picker.

Other information may be provided as well, including any data which the ESP can reliably attribute to a given IP. Such information can come from essentially any significant protocol exchanges over TCP, leveraging the relative security of the Internet's routing infrastructure to ensure that a TCP sequence number attack to spoof the source address is not practical. As such, the data that could be provided is almost unlimited, but the most relevant to the system at hand is nefarious behavior. Possibilities include excessive bandwidth consumption or activity, or even worm infection attempts or Denial of Service (DoS) attack information.

Figure 14:
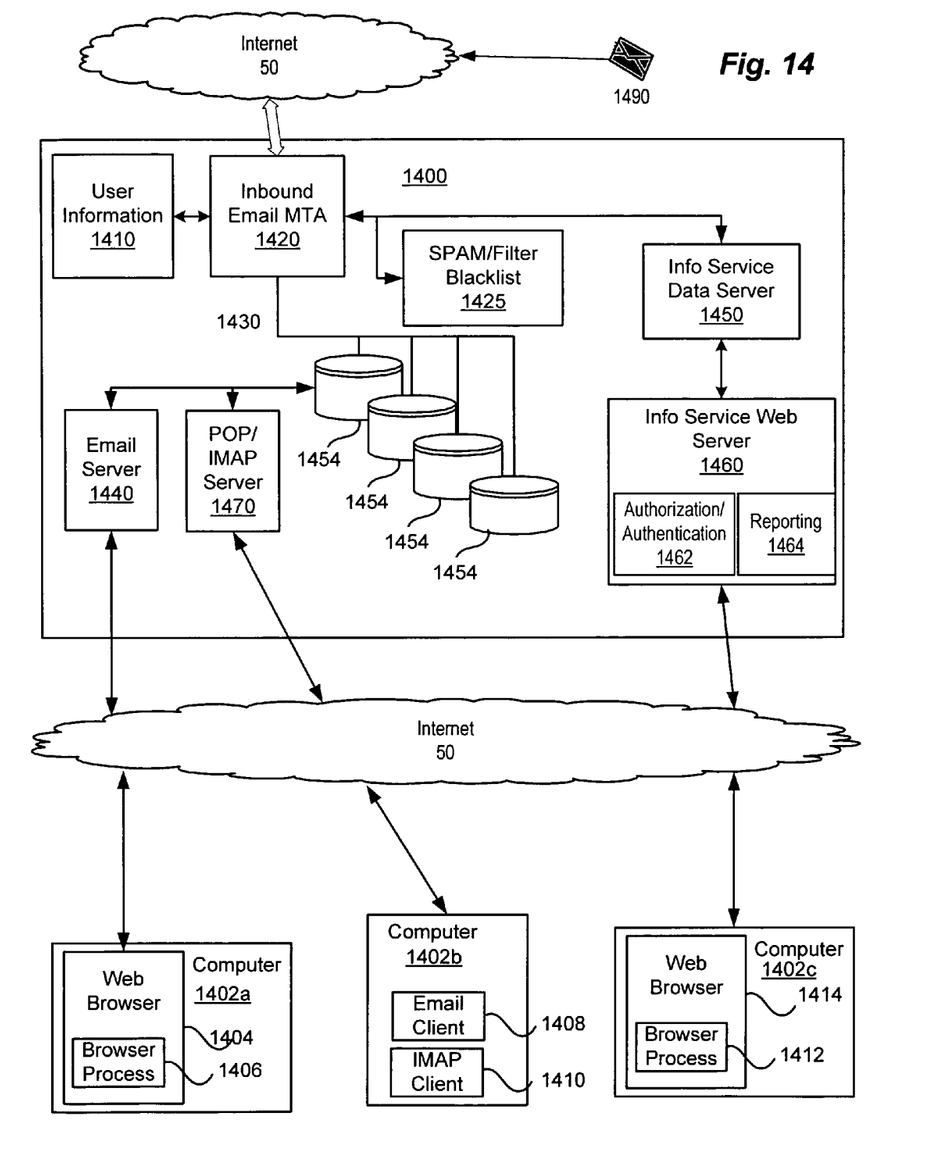
FIG. 14 is a block diagram illustrating a system for implementing a method of the present invention.

FIG. 14 is a block level diagram of a system suitable for implementing the present invention. System 1400 is comprised of a plurality of computing devices maintained by the ESP. In one embodiment, it may consist of, for example, an inbound email message transfer agent (MTA) 1420, a user information database server 1410, user mail storage units 1454, an email server 1450, SPAM/Blacklist server 1425 and a POP/IMAP server 1470. System 1400 also includes an Info Service database server 1450 and one or more Web-servers 1460 providing the Web interfaces (or email reports and forms) described above in accordance with well known techniques.

Typical messages 1390 from senders to users having accounts with the ESP are sent via Internet 50 to the inbound MTA 1420. System 1400 allows users operating processing devices 1402a, 1402b to access their email data. It should be understood that users may connect to system 1400 via any number of public or private networks, including the Internet.

Inbound email MTA 1420 is a front end server to which emails 1490 transmitted via the Internet (or other suitable network) to the system 1400 are directed. The user database server 1410 is a data store of user account and storage location information for each of the users having a user account or email address within system 1400. The user database server 1410 stores information allowing users to authenticate themselves to the system 1400 to access their email, and to allow other servers in the system to direct mail within the system to storage locations on storage units 1454 based on the routing instructions in the system 1400. The storage units 1454 are essentially large disc arrays storing actual user message information. The system may include additional components not shown here for convenience in understanding the present invention. Spam/Blacklist server 1425 runs SPAM filters on incoming messages to segregate them from user accounts.

Email server 1450 may comprise a Web server which provides an email interface to a Web browser 1408 which institutes a browser process 1406 on a user computer 1422. Email server 1450 can render email data from the data storage units to a user using computer 1402 to access the email system 1400. Likewise POP/IMAP server 1470 can provide email data to a POP email client 1418 or an IMAP client 1410 on user computer 1412.

Web server 1460 provides an access point for any authorized user and includes an authorization/authentication engine 1462 and reporting engine for implementing the method of FIG. 3 and the report of FIG. 13, respectively, described herein. Info service database server 1450 may include a data store and instructions to periodically retrieve information from other servers in the system. For example, data server 1450 may periodically pull data for reporting in the interface of FIG. 14 from the MTA, user information and spam filter servers so that queries by a user via Web server 1460 do not place an undue load on other parts of the system and potentially expose them to denial of service attacks. Information can be imported into the data store on a timed basis during low load times. Database server 1450 may be implemented by a SQL datastore allowing Web server 1460 to retrieve data by simple SQL queries for the information necessary to generate the report of table 1320. Other database implementations are contemplated as being within the scope of the invention, as is a system where no database server 1450 is provided, but data is retrieved from records stored directly on the MTAs.

Figure 15:
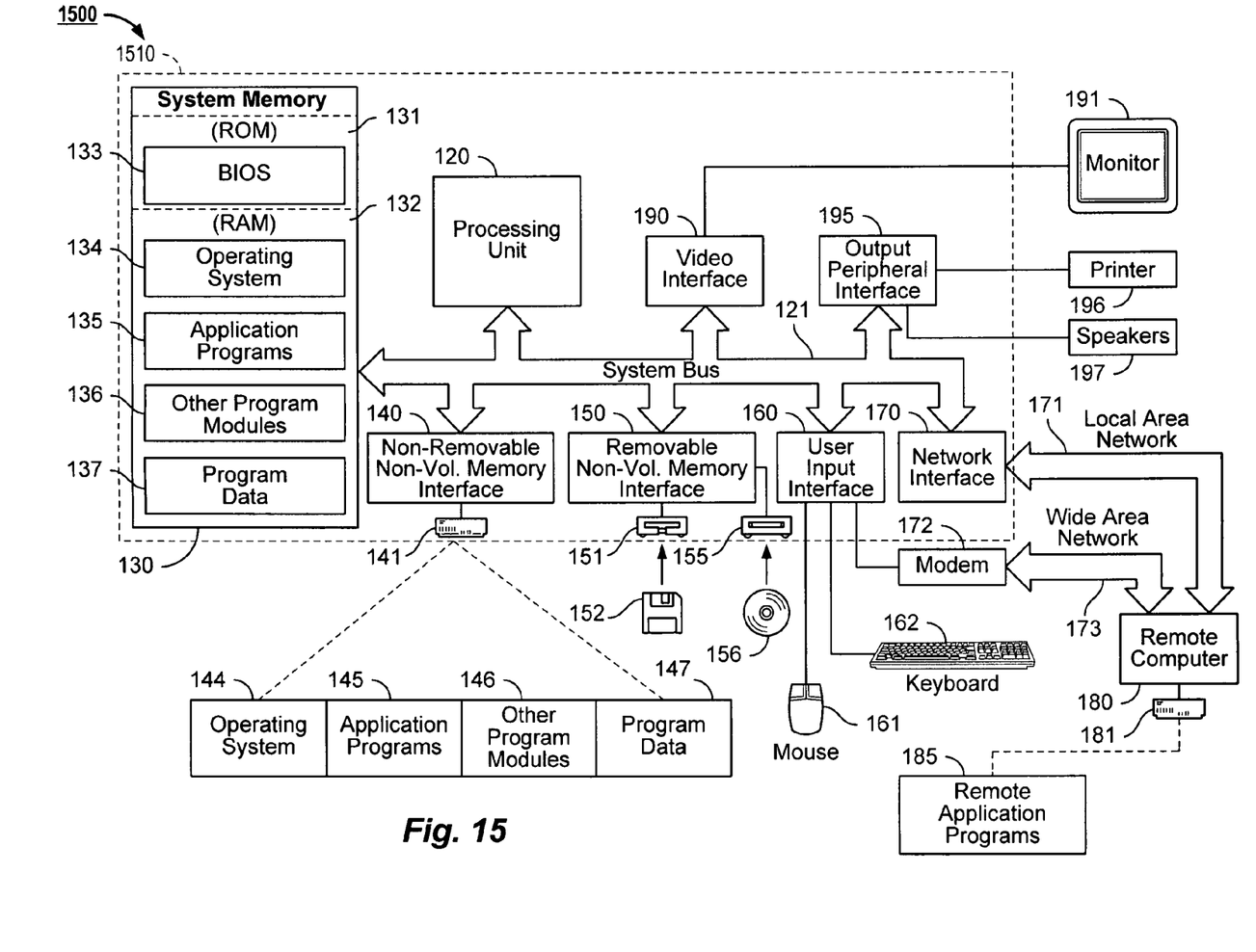
FIG. 15 is a block diagram of a processing device suitable for implementing any of the processing devices illustrated in FIG. 14.

FIG. 15 shows an exemplary system for implementing the invention includes a general purpose computing device in the form of a computer 1510. Components of computer 1510 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1510 typically includes a variety of computer readable media. Computer readable media can be any available media that can be accessed by computer 1510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 1510, such as during startup, is typically stored in ROM 131. RAM 132 typically contains data and/or program modules that are immediately accessible to and/or presently being operated on by processing unit 120. By way of example, and not limitation, FIG. 15 illustrates operating system 134, application programs 135, other program modules 136, and program data 137.

The computer 1510 may also include other removable/non-removable, volatile/nonvolatile computer storage media. By way of example only, FIG. 15 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 15, provide storage of computer readable instructions, data structures, program modules and other data for the computer 1510. In FIG. 15, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 1510 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 1510, although only a memory storage device 181 has been illustrated in FIG. 15. The logical connections depicted in FIG. 15 include a local area network (LAN) 171 and a wide area network (WAN) 173, but may also include other networks. Such networking environments are commonplace in offices, enterprise-wide computer networks, intranets and the Internet.

When used in a LAN networking environment, the computer 1510 is connected to the LAN 171 through a network interface or adapter 170. When used in a WAN networking environment, the computer 1510 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 1510, or portions thereof, may be stored in the remote memory storage device. By way of example, and not limitation, FIG. 15 illustrates remote application programs 185 as residing on memory device 181. It will be appreciated that the network connections shown are exemplary and other means of establishing a communications link between the computers may be used.

A regular maintenance process may also be implemented by the system. Since IPs and IP blocks regularly change ownership, the system may periodically check that an address that a user used as a validated email address still belongs to the block by performing the steps 802-818 of FIG. 8, and checking the result against the last email used to authorize users currently authorized to obtain results. This would not cause any inconvenience to the user, and would provide some measure of comfort to the information system provider that the information continues to be provided only to authorized individuals. In other embodiments, more aggressive mechanisms could provide stronger such guarantees, for example by periodically forcing users to re-authorize, but must be balanced with the overall usability of the system.

In another alternative embodiment, additional authoritative procedures may be introduced to allow users the ability to more authoritatively prove themselves, to allow them access to actual complaints received about the block. This would allow organizations that provide direct or indirect email access to see what account sent the complained-about mails and deal with them appropriately. Similarly, it would help ISPs to deal with abuse of their outgoing mail servers, as they could see submitting IPs and Received times in the complaints.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for providing information concerning use of processing devices coupled to a network, each device having an IP address, comprising:
   receiving, at a processing device, a plurality of email messages from processing devices coupled to the network, a portion of said plurality of email messages originating with a block of IP addresses under the administration of the user;
   receiving at the processing device, a request from the user to view information regarding email message activities of the block of IP addresses;
   responsive to the request, automatically determining an email address associated with an IP address in the block of IP addresses from at least one of a reverse DNS record associated with an IP range containing the IP address or a WHOIS record associated with the IP range at which the user is authorized to receive email;
   verifying the user access to the email address to verify the user is authorized to receive information about the activities of the block of IP addresses;
   responsive to a request to view information about the block, authenticating the user through a login authentication process; and
   providing data to the user about email activities of one or more selected IP addresses in the block of IP addresses, comprising:
      providing to the user, the number of recipients of a message (RCPT TO commands) received from the IP address;
      providing to the user, the number of DATA commands associated with the RCPT TO commands for the IP address; and
      providing to the user, the number of recipients associated with the DATA commands for the IP address.

2. The method of claim 1 wherein the data comprises protocol command metadata.

3. The method of claim 1 wherein the data is qualitative information regarding the processing device at said address.

4. The method of claim 3 wherein the qualitative information includes actions taken against the identifiable address.

5. The method of claim 3 wherein the qualitative information is user complaints.

6. The method of claim 1 where data comprises trap account hits.

7. The method of claim 1 wherein the step of determining includes determining the email address associated with an IP range by first performing a reverse DNS query associated with the IP range, and if no record exists, examining a WHOIS record associated with the IP range.

8. The method of claim 7 wherein said step of authorizing includes sending an email the user at a user-chosen trusted email address.

9. An automated method which determines a relationship between an Internet Protocol (IP) address and a user to allow the user to view email statistics concerning one or more IP addresses in a block of IP addresses from an enterprise email provider, comprising:
   receiving, at the enterprise email provider, a plurality of email messages from processing devices coupled to a network and outside the enterprise email provider, a portion of said plurality of email messages originating with a block of IP addresses under administration of a user;
   receiving at the enterprise email provider a request from the user to view information regarding activities emanating from the block of IP addresses;
   following the request, automatically determining one or more verifiable email address associated with an IP address in the block of IP addresses by first performing a reverse DNS lookup for a record associated with the one or more addresses, followed by a WHOIS lookup for a record associated with the one or more IP addresses;
   verifying the user has access to at least one of the verifiable email address to verify the user is authorized to receive email at the email address;
   storing an association between the user and the block of IP addresses;
   authenticating the user through a login authentication process; and
   providing data to the user about activities of one or more IP addresses in the block of IP addresses, comprising at least one of:
   providing the number of recipients of a message (RCPT TO commands) received from the IP address, to the user;
      providing the number of DATA commands associated with the RCPT TO commands for the IP address, to the user;
      providing the number of recipients associated with the DATA commands for the IP address, to the user;
      providing a filter status indicating the number of messages transferred from the IP address labeled as spam, to the user; and
      providing the number of complaints or spam filter hits that have caused the processing device to block messages coming from the IP address, to the user.

10. The automated method of claim 9 wherein the step of verifying includes sending an email the user at a user-chosen trusted address.

11. The automated method of claim 10 wherein said email includes a random token which proxies for proof of ability to read mail at said user-chosen trusted address.

12. The automated method of claim 11 wherein the step of determining is performed by parsing at least one reverse DNS query record for a single domain at which standard email addresses can be trusted.

13. The automated method of claim 12 wherein the step of determining is performed by a parsing a WHOIS query record for an email addresses which can be trusted.

14. The automated method of claim 13 wherein where a sampling of an IP range is used to obviate queries for all IPs in a range of IPs.

15. An automated method which determines a relationship between an Internet Protocol (IP) address and a user to allow the user to view email statistics concerning email messages emanating from the IP address in a block of IP addresses, comprising:
   receiving, at an enterprise email provider, a plurality of email messages from processing devices outside the enterprise email provider via a network, a portion of said plurality of email messages originating with a block of IP addresses under administration of the user;
   receiving at the enterprise email provider a request from the user to view email statistics regarding messages emanating from the block of IP addresses, each device having an IP addresses:
   following the request, automatically determining a verifiable email address associated with an IP address of at least one of the processing devices in the subset by first performing a reverse DNS lookup for a record associated with the address, followed by a WHOIS lookup for a record associated with the IP addresses;

if an email address is found as a result of said step of automatically determining, prompting the user to select the email addresses;

verifying user access to at least one of the verifiable email address by emailing a verification link to the user at the email address;

responsive to a request to view information about the block of IP addresses, authenticating the user through a login authentication process;

receiving from the user, at least one of a date range for which the user chooses to view information about the block of IP addresses and a time range for which the user chooses to view information about the block of IP addresses; and if the user selects the verification link, providing data to the user about email activities of one or more IP addresses in the block, the providing comprising generating a report filtered by the date range and the time range specified by the user, the report comprising:

displaying the number of recipients of a message (RCPT TO) commands received from the IP address, to the user;

displaying the number of DATA commands associated with the RCPT TO commands for the IP address, to the user;

displaying the number of recipients associated with the DATA commands, for the IP address, to the user;

displaying a filter status indicating the number of messages transferred from the IP address labeled as spam, to the user; and displaying the number of complaints or spam filter hits that have caused the processing device to block messages coming from the IP address, to the user.

16. The method of claim 15 wherein the step of determining includes determining a plurality of verifiable addresses in the block and the method further includes the step of prompting the user for a selection of one of the plurality of addresses.

* * * * *